(12) United States Patent
Brine

(10) Patent No.: US 7,182,034 B2
(45) Date of Patent: Feb. 27, 2007

(54) OFFSHORE FLOATING DOCK

(76) Inventor: William H. Brine, 14 Rope Ferry Rd., Hanover, NH (US) 03755

( * ) Notice: Subject to any disclaimer, the term of this patent is extended or adjusted under 35 U.S.C. 154(b) by 0 days.

(21) Appl. No.: 10/862,097

(22) Filed: Jun. 4, 2004

(65) Prior Publication Data
US 2005/0268836 A1 Dec. 8, 2005

(51) Int. Cl.
*B63B 35/44* (2006.01)
*E02B 3/00* (2006.01)

(52) U.S. Cl. .................. 114/263; 405/219

(58) Field of Classification Search ............ 114/219, 114/258, 263, 264–267; 441/3; 405/218–220; D12/316
See application file for complete search history.

(56) References Cited

U.S. PATENT DOCUMENTS

| | | | |
|---|---|---|---|
| 3,041,639 A | 7/1962 | Atlas | |
| 3,320,918 A | 5/1967 | Zalejski | |
| 3,521,588 A | 7/1970 | Atlas | |
| 3,616,774 A * | 11/1971 | Thompson | 114/266 |
| 3,672,178 A | 6/1972 | Trautwein | |
| 3,839,977 A * | 10/1974 | Bradberry | 114/256 |
| 3,925,991 A * | 12/1975 | Poche | 405/65 |
| 4,067,285 A | 1/1978 | Jones et al. | |
| 4,292,005 A * | 9/1981 | Boksjo | 405/219 |
| 4,438,957 A * | 3/1984 | Williams et al. | 285/223 |
| 4,559,891 A | 12/1985 | Shorter, Jr. | |
| 4,650,389 A * | 3/1987 | Mulqueen | 414/10 |
| 4,664,892 A * | 5/1987 | Wanek et al. | 423/2 |
| 4,727,820 A * | 3/1988 | Klaus | 114/263 |
| 4,979,453 A | 12/1990 | Sloan et al. | |
| 5,050,361 A | 9/1991 | Hallsten | |
| 5,081,946 A * | 1/1992 | Nannig et al. | 114/264 |
| 5,107,784 A | 4/1992 | Lacy | |
| 5,267,811 A | 12/1993 | Evans | |
| 5,297,899 A * | 3/1994 | Culley | 405/219 |
| 5,398,633 A | 3/1995 | Loverich et al. | |
| 5,512,787 A | 4/1996 | Dederick | |
| 5,911,542 A | 6/1999 | Obrock et al. | |
| 5,915,325 A | 6/1999 | Gerber | |
| 6,003,464 A | 12/1999 | Long | |
| 6,176,195 B1 | 1/2001 | Gregory | |
| 6,205,945 B1 | 3/2001 | Passen et al. | |
| 6,302,048 B1 * | 10/2001 | Smedal | 114/230.12 |
| 6,318,932 B1 | 11/2001 | Tyler | |
| 6,409,431 B1 | 6/2002 | Lynch | |
| 6,443,086 B1 | 9/2002 | Actis-Grande et al. | |
| 6,450,737 B1 | 9/2002 | Rytand et al. | |
| 6,488,554 B2 | 12/2002 | Walker | |
| 6,547,485 B2 | 4/2003 | Elson | |

(Continued)

FOREIGN PATENT DOCUMENTS

JP 57209487 A * 12/1982

*Primary Examiner*—Ajay Vasudeva
(74) *Attorney, Agent, or Firm*—Brian M. Dingman, Esq.; Mirick, O'Connell, DeMallie & Lougee

(57) ABSTRACT

The docking system of the invention comprises: at least one docking unit having an axis to which at least two boats may be docked offshore; at least one buoyant members coupled to docking unit; and at least one anchoring member adapted to anchor the platform to a substrate; wherein the docking unit is adapted to directionally adjust to changes in prevailing wind and water flow.

9 Claims, 12 Drawing Sheets

U.S. PATENT DOCUMENTS

| | | |
|---|---|---|
| 6,558,083 B1 | 5/2003 | Quandt |
| 6,565,286 B2 | 5/2003 | Carr et al. |
| 2004/0115005 A1* | 6/2004 | Baan .......................... 405/169 |
| 2004/0134405 A1* | 7/2004 | Lekhtman ................... 114/263 |
| 2006/0118027 A1* | 6/2006 | Hill ............................ 114/264 |

* cited by examiner

OFFSHORE FLOATING DOCK

FIELD OF THE INVENTION

This invention relates to boat docks and more specifically to an offshore floating dock.

BACKGROUND OF THE INVENTION

Over the past ten to twenty years, the availability of open boat dock space has risen to a premium. Virtually all harbors and their potential customers have the same problem, namely, a long waiting list for moorings. In many instances, the actual wait time is as long as a person's lifetime. Floating docks that attached to fixed docks or otherwise to the shoreline to increase the length of fixed docks are known and widely used in the art. Examples of such floating docks are described in U.S. Pat. No. 5,915,325 to Gerber; U.S. Pat. No. 6,003,464 to Long; U.S. Pat. No. 5,911,542 to Obrock et al.; and U.S. Pat. No. 6,205,945 B1 to Passen et al. However, none of these floating docks are adapted for offshore locations.

Prior to now, previous attempts to use offshore devices to resolve the space problems associated with crowded harbors are largely unsuccessful, particularly for harbors that have a lot of traffic or are located on a narrow waterway. One type of such device is little more than a permanent anchor located offshore with a balloon or buoy attached such as the device described in U.S. Pat. No. 6,488,554 B2 to Walker. The limitations and value of such devices are known, as are the additional problems they cause in the process. Furthermore, since only one boat can be moored to such devices, the maximum safe mooring density is quite low.

A few devices for mooring more than one boat offshore at a time are described in U.S. Pat. No. 5,398,633 to Loverich et al.; U.S. Pat. No. 5,107,784 to Lacy; U.S. Pat. No. 4,979,453 to Hallsten; U.S. Pat. No. 4,067,285 to Jones et al.; U.S. Pat. No. 3,521,588 to Atlas; U.S. Pat. No. 3,672,178 to Trautwein; U.S. Pat. No. 3,041,639 to Atlas; and U.S. Pat. No. 5,297,899 to Culley. However, each one of these offshore devices has inherent problems. Loverich's device is basically a tautline strung offshore, that is held in a fixed position along its length by an anchor assembly at each end, to which boats are tied to along both sides of the line. Although Loverich's line potentially could provide for temporary offshore mooring, Loverich's offshore line does not provide sufficient means for protecting the boats from damaged caused by adjacently moored boats or from rough or varying water activity. Lacy's offshore device has similar problems and is somewhat impractical. Lacy's device would be expensive to make and install at least because it utilizes blocks of cement weighing two tons each as anchors. The devices of Hallsten, Jones et al., Atlas, Trautwein, and Culley are all somewhat complex and expensive to make. More importantly, the devices and the boats moored to the devices are subject to damage associated with varying weather and current conditions because they are anchored in a fixed directional position.

SUMMARY OF THE INVENTION

It is therefore a primary object of this invention to provide an offshore multiple boat docking system.

It is a further object of this invention to provide an offshore boat dock that allows boats moored to the dock to adjust to the prevailing wind and water conditions.

It is a further object of this invention to provide a versatile, modular boat docking system.

The docking systems of the invention were designed to address the widespread problem of severely limited available space at virtually all harbors. The docking system is stable in high winds and moderate seas and is adapted to be modular and to provide as many units as desired on a single mooring.

The features of the docking systems of the invention may be used alone or in combination based on the needs and geography of a given harbor.

A preferred embodiment of the docking system of the invention comprises: at least one docking unit having an axis to which at least two boats may be docked offshore; at least one buoyant members coupled to docking unit; and at least one anchoring member adapted to anchor the platform to a substrate; wherein said docking unit is adapted to directionally adjust to changes in prevailing wind and water flow. The system may more specifically comprise at least one first docking unit having rearward end and a second docking unit having a forward end and a means for connecting said rearward end of said first docking unit to the forward end of said second docking unit; wherein said rearward end of said first docking unit preferably has a width that is larger than said width of said forward end of said second docking unit, so that said connected docking units form at least two docking stations offset from said axis. The docking unit has a perimeter that is substantially trapezoid in shape.

The docking stations also preferably comprise at least one bumper component adapted to inhibit a boat docked at said second docking unit from directly hitting said first docking unit.

The offset docking stations have an opening adapted to receive a bow of a boat therein, wherein said opening is preferably substantially triangular in shape.

The anchoring member may comprise a mooring ball and the docking unit preferably further comprises a platform. Depending on the embodiment desired, the docking unit may further comprise at least two dock wings and/or at least two opposing sides offset from said forward and rearward ends.

The docking unit may also be provided with a means for attaching mooring lines to a bow end and a stem end of a boat and the anchor member preferably comprises a ball bearing to enable said docking unit to orient itself in response to prevailing conditions.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS AND METHODS

The invention features a boat docking system designed to accommodate a greater number of boats in a given harbor than would normally be allowable in view of coastline space constraints. Only one anchor is needed to maintain the docking system.

Figure 1:
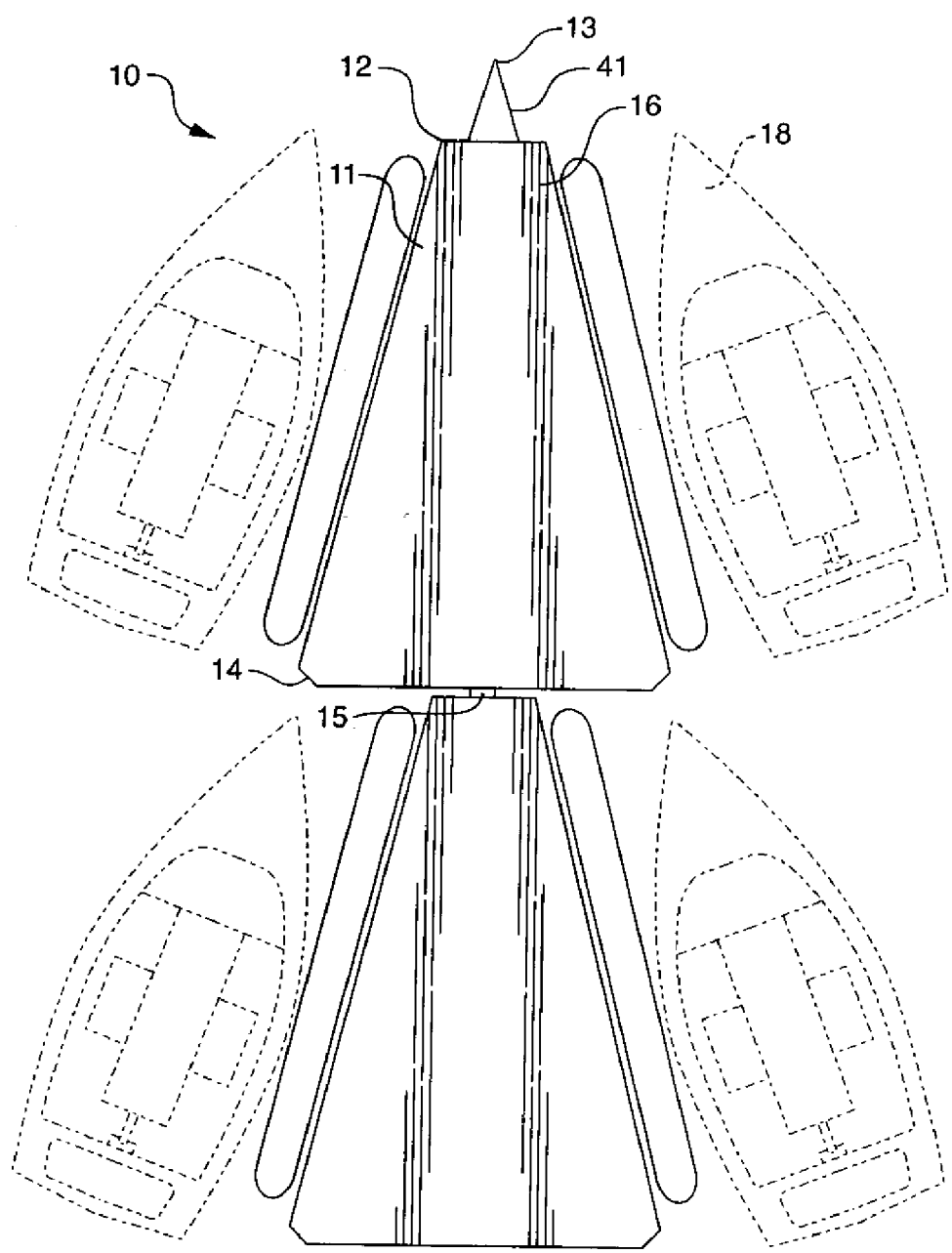
FIG. 1 is a top view of a preferred embodiment of the dock of the invention showing the general position of boats moored to the dock.
Figure 2:
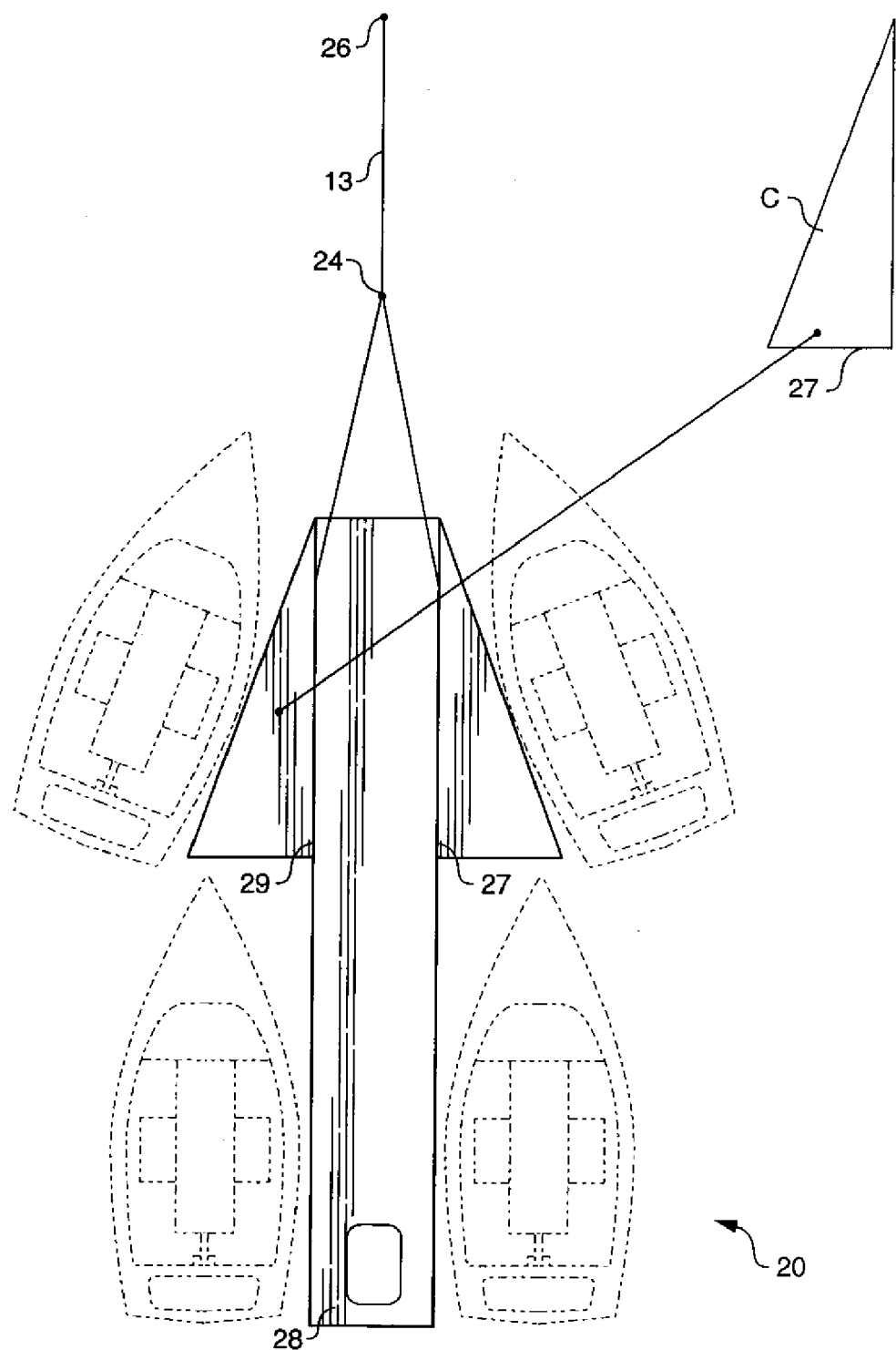
FIG. 2 is a top view of another preferred embodiment of the dock of the invention showing the general position of boats moored to the dock.
Figure 3:
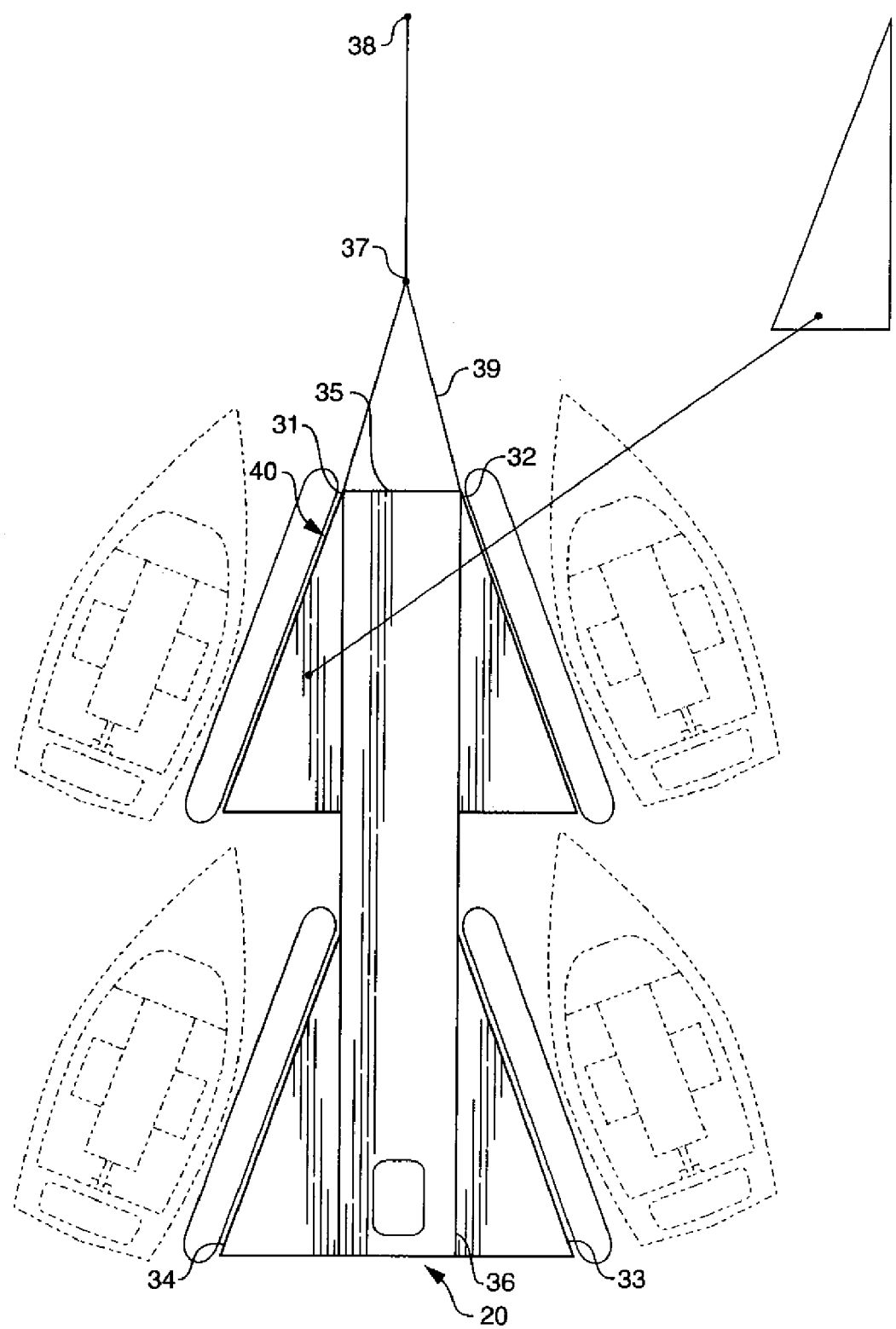
FIG. 3 is a top view of another preferred embodiment of the dock of the invention showing the general position of boats moored to the dock.

The preferred docking unit of the invention is preferably, although not limited to, about twenty feet long and holds two or more boats in a manner so that the boats are held in position into the wind when tied to the floating dock. Each dock is preferably angled because it is easier for a sailboat to tie on to an angled dock rather than a straight dock or mooring because the wind tends to push the boat into a bumpered dock causing undesirable, sudden motion of the boat, its passengers, and its contents. FIGS. 1–3 show three slightly different embodiments, generally referred to as docking units 10, 20, and 30, respectively, of the docking system of the invention, each providing for two to four mooring stations. A boat is moored using a bow line 16 with a cleat 18. Each of these systems is made up of two docking units 11, however, any number of docking units may be employed depending on the number of docking stations needed.

The optimum dimensions for the docking units for sailboats are preferably about four feet wide at the bow end 12 and about 14 feet wide at the stem end 14. These dimensions will naturally point the direction of the boat when docked into the wind. The wider stem provides added stability. The wide with of the dock itself also provides ideal space for storing gear such as solar chargers, wind or portable electric generators for charging boat batteries with an auxiliary motor. It also provides space for pedestrians and boaters alike who may want to linger or otherwise socialize on the docking area. It is also easier for boat race launches to pickup crews from more than one boat.

Figure 4A:
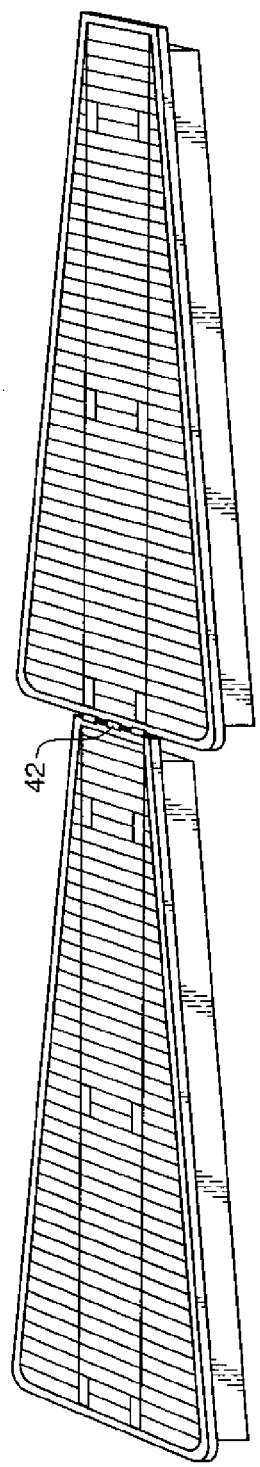
FIG. 4 is a front view of the preferred embodiment shown in FIG. 1.
Figure 4B:
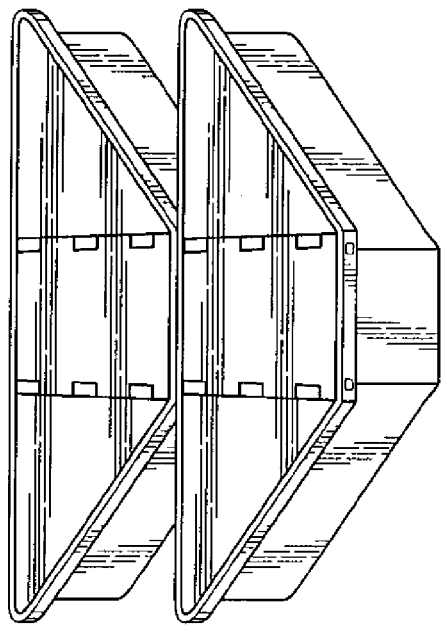
Figure 6:
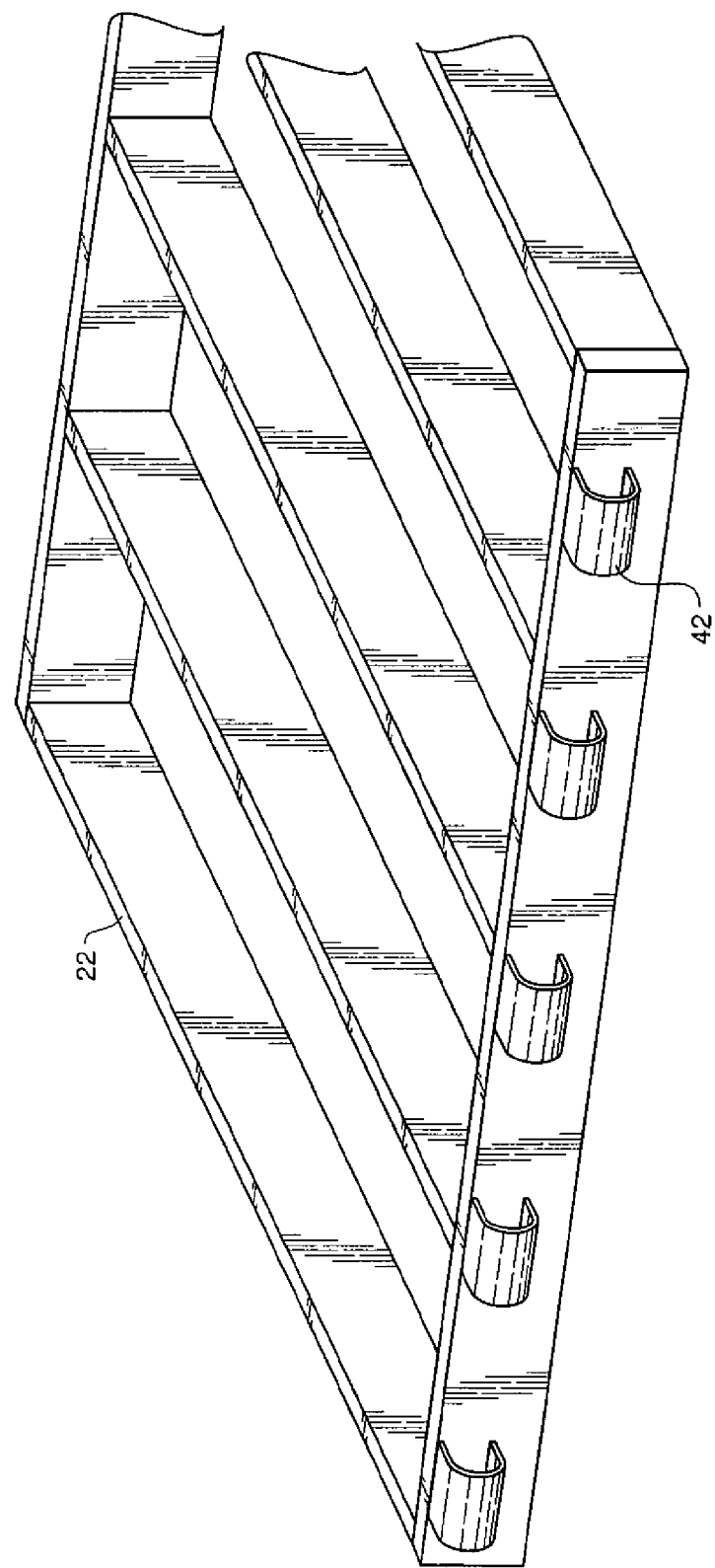
FIG. 6 is a perspective view of a framing unit of the dock of the invention shown in FIG. 1.
Figure 7:
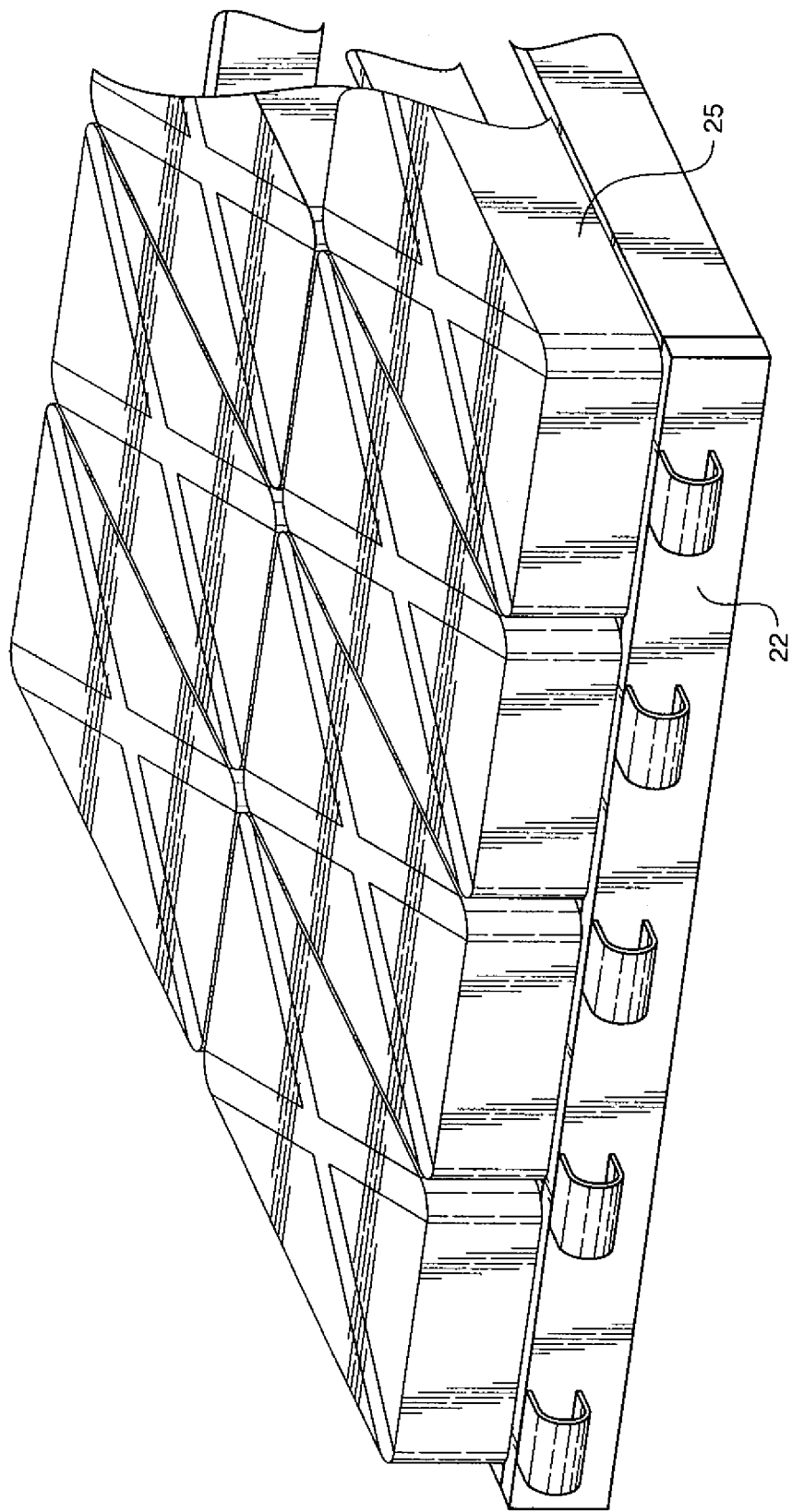
FIG. 7 is a perspective view from the bottom of the framing unit shown in FIG. 6 with flotations attached.

The platform or docking unit frame 22, as shown in FIGS. 4, 6, and 7, is preferably made from aluminum because it is strong and yet light weight. Pipe members 42, shown in FIG. 6, are fixed to the side of the aluminum frame. The pipe member are used to connect a first docking unit to a second docking unit, as shown in FIG. 4 so that the units can move relative to each other in a vertical direction to allow the docking system to ungulate with the waves. The pipe members fit together like a hinge. Other similarly suitable connection means may be used that would enable the docking system to ungulate along its length.

By using a broad beam, the floating dock always points into the wind, current, or tide flow. Even when more boats are docked on one side of the dock versus the other side, the dock will still point into the wind or tide. The mooring line may be attached directly to a point in the front one third of the first float that will further reduce the length of the swing circle.

Figure 5:
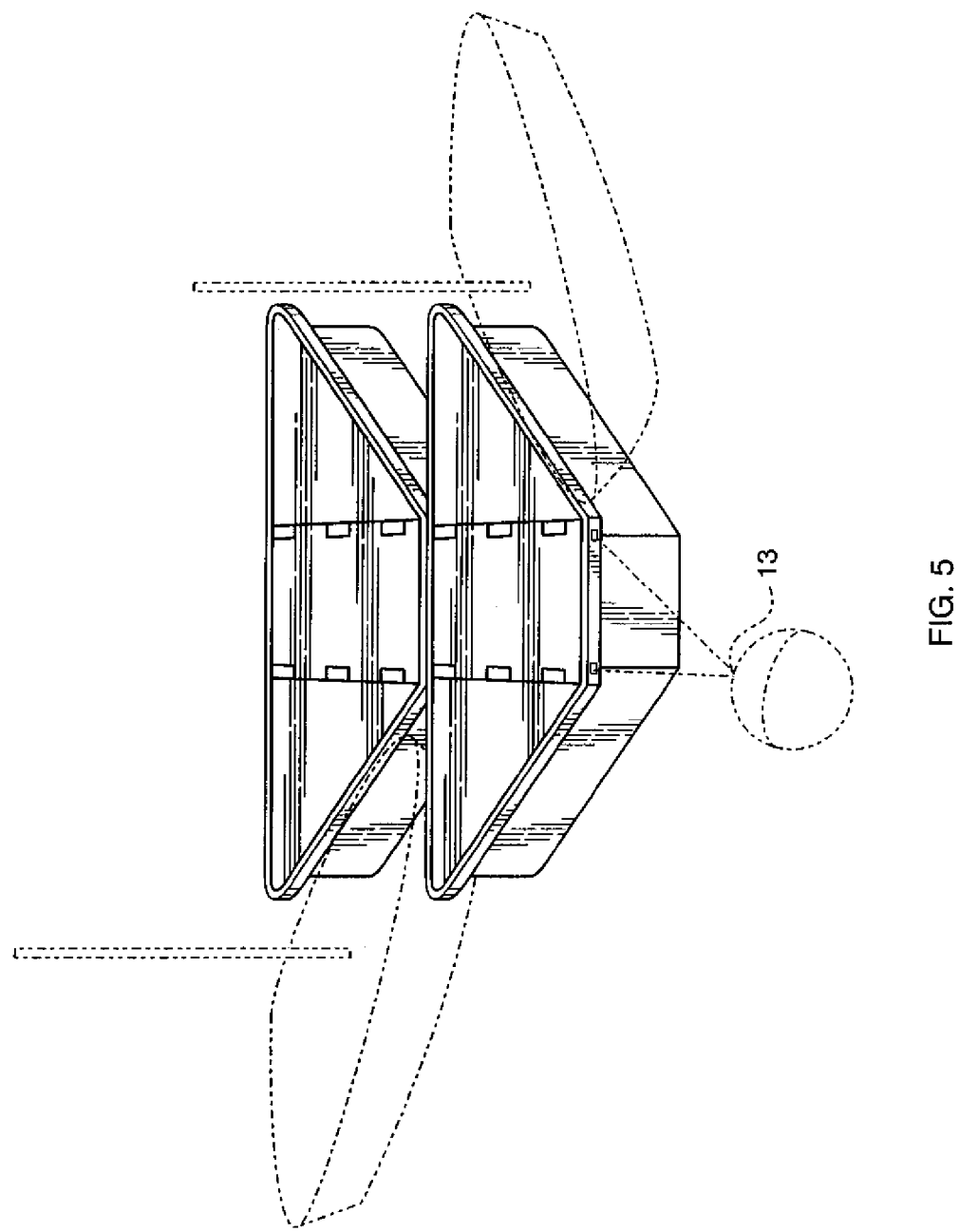
FIG. 5 is a front view of the preferred embodiment shown in FIG. 4 anchored offshore with two sailboats moored to the dock.

The docking units are preferably attached to each other with a flexible up and down joint 15 that has a ridged side-to-side joint. Depending on the strength of the anchoring system 26 and the swing length of the mooring location, the dock may have numerous units in a chain. When there is more than one docking unit in a docking system, the second dock preferably has a padded dock to prevent any chance of contact with the stem of a boat in the front unit in instances in which a boat entering the rearward unit enters the dock too fast when mooring. The docking system may be attached directly or indirectly to the anchoring chain 13. The dock preferably comprises a ball bearing 24 to allow the dock to turn into the wind with the slightest breeze without winding up the anchor chain as shown in FIGS. 2 and 5. The shorter the swing length of a given harbor, the more moorings the harbormaster may install.

As described, the docking units preferably have a platform that comprises an aluminum frame. The frame is supported by one or more buoyant flotation members 25 shown in FIG. 7. The flotation members are preferably made from a sturdy, durable plastic material. The frame defines sailboat-docking areas on each side of the platform. There can be one or more docking areas on each side of the platform. In instances in which there is more than one docking area on each side, the docking system utilizes additional docking units that physically separate the docked boats. The arrangement preferably is such that the boats meet the dock at an angle so that they can be nested. The result is that the mooring can hold a number of linear feet of boats that is longer than the actual length of the dock.

As shown by docking unit 20, a single docking unit 28 may accommodate more than one boat. Docking unit 20 is provided with dock wings 27 that generally reflect the shape of a right triangle preferably with interior angles of 90, 70, and 20 degrees. Side C of wing 27 effectively provides a dockside that is offset from the axis of the docking unit. The wing provides stability and facilitates boat boarding. The offset side of wing 27 serves at least two additional purposes, to provide a bow station 29 for a boat moored at a rearward station and to prevent two boats moored on the same side of the docking unit from coming in contact with each other as the docking unit may sway to and fro depending on the prevailing water and wind conditions.

Similarly, docking unit 30, shown in FIG. 3 is adapted to moor four boats and has four sides 31–34 that are offset from the forward end 35 and rearward end 36. As previously described, docking units 20 and 30 also preferably comprise a bottom anchor 38 that fixes the docking system to a substrate on the floor of the body of water, a mooring ball 37 preferably having a ball bearing to allow the docking system to orient based on the prevailing conditions, and a mooring bridle to indirectly connect the first docking unit to the anchor member. The preferred embodiment of docking unit 30 is about 40 feet long to accommodate two 20 foot boats on each side. The mooring pennant length between the front end of the docking unit and the mooring ball is preferably about 12 feet. Pipe 40 may be utilize to accommodate a mooring chain.

Figure 8:
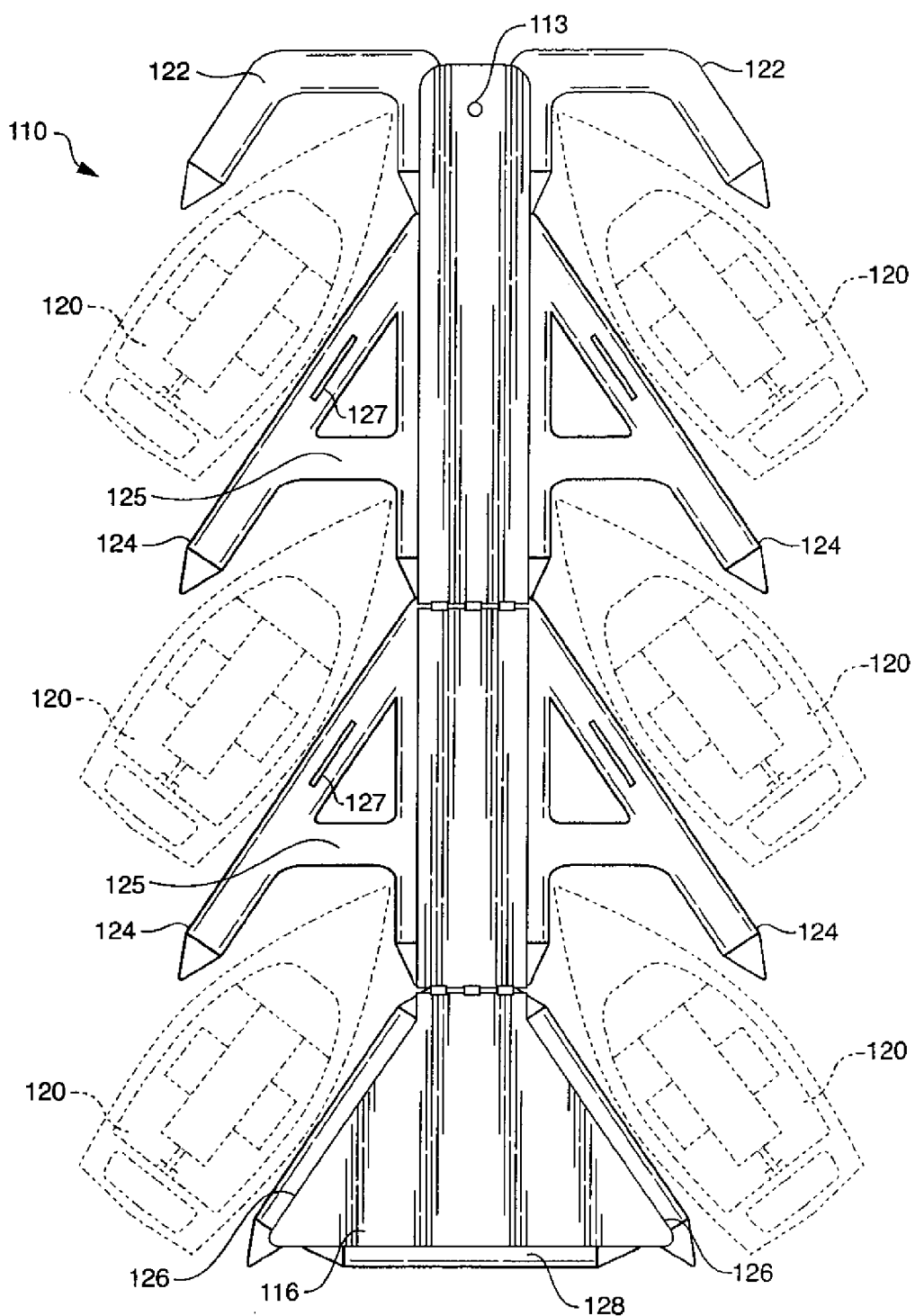
FIG. 8 is another preferred embodiment of the dock of the invention showing the general position of boats moored to the dock.
Figure 9:
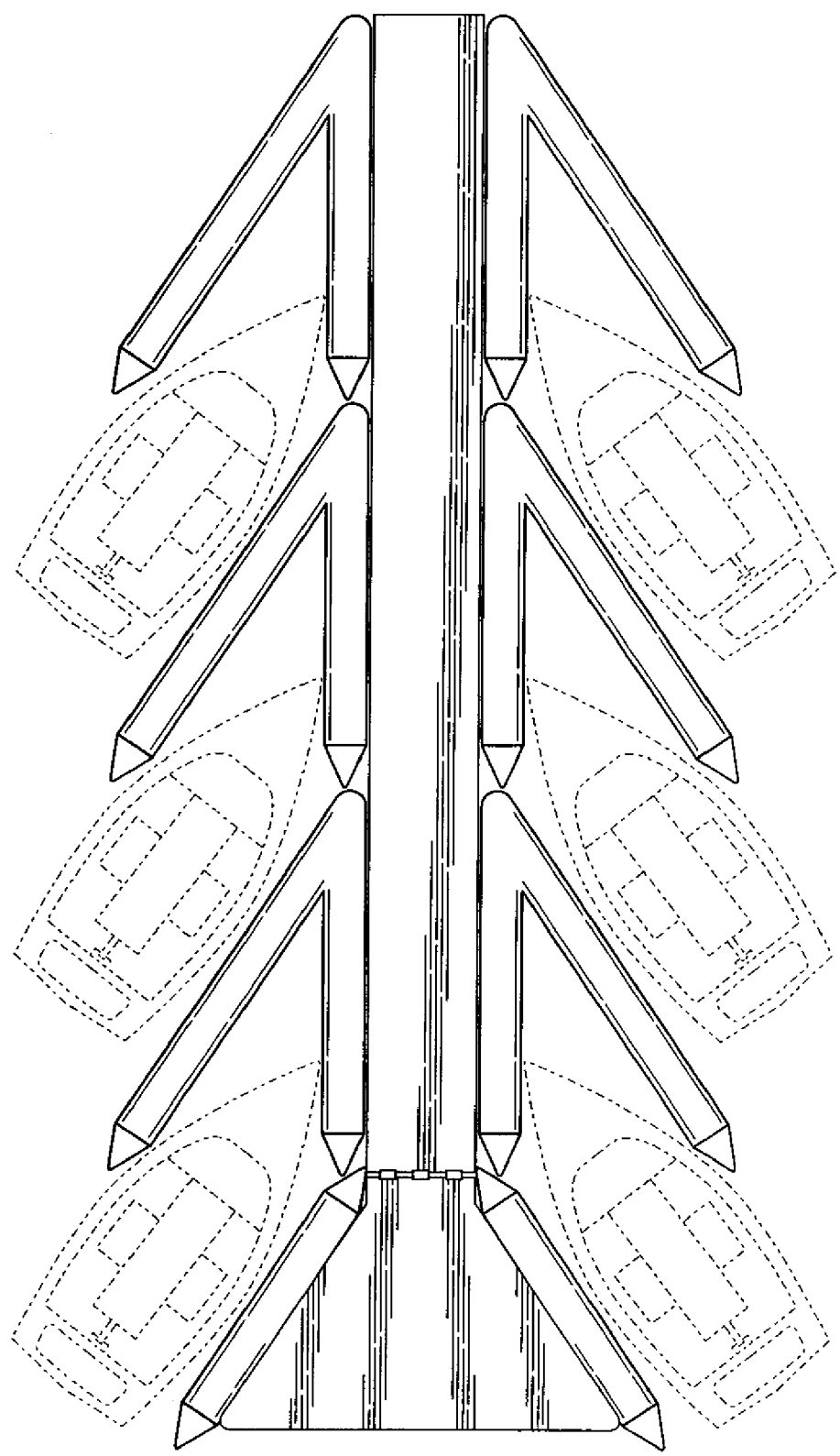
FIG. 9 is another preferred embodiment of the dock of the invention showing the general position of boats moored to the dock.
Figure 10:
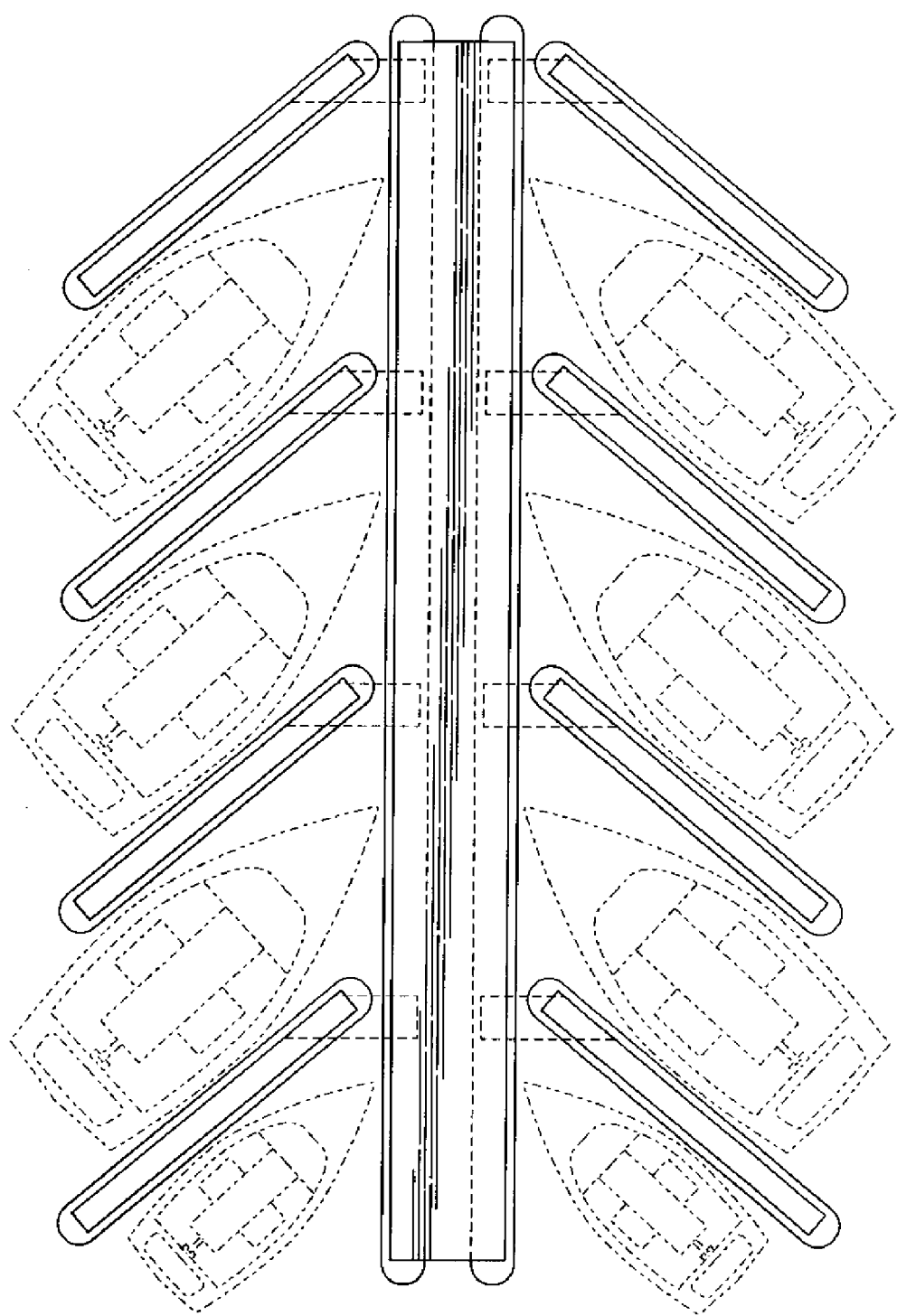
FIG. 10 is another preferred embodiment of the dock of the invention showing the general position of boats moored to the dock.
Figure 11:
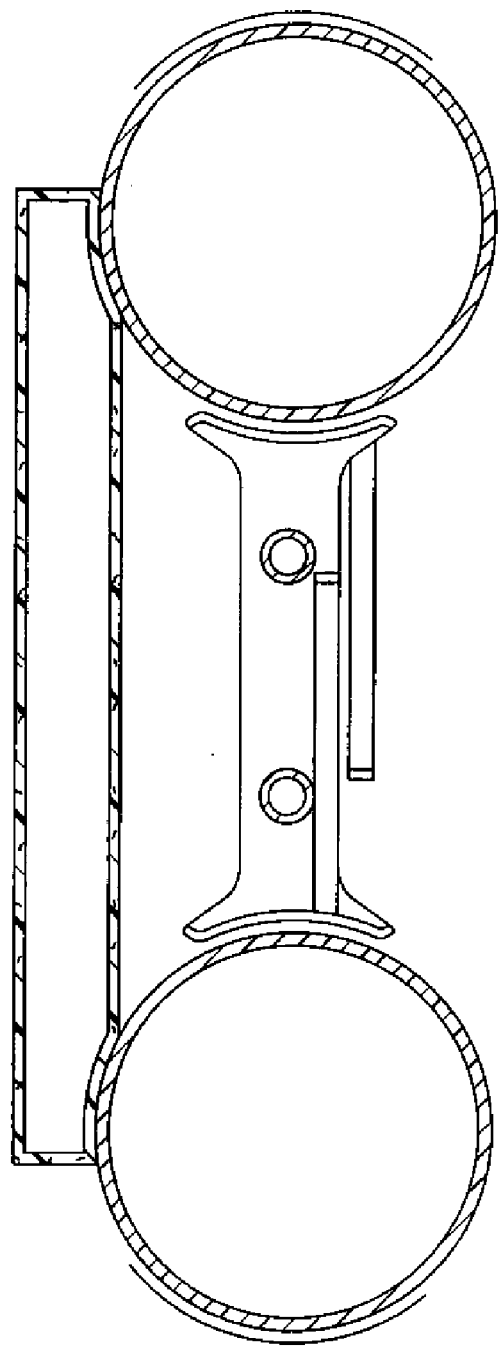
FIGS. 11 and 12 are cross-sectional partial views of the frame members shown in FIG. 8.
Figure 12:
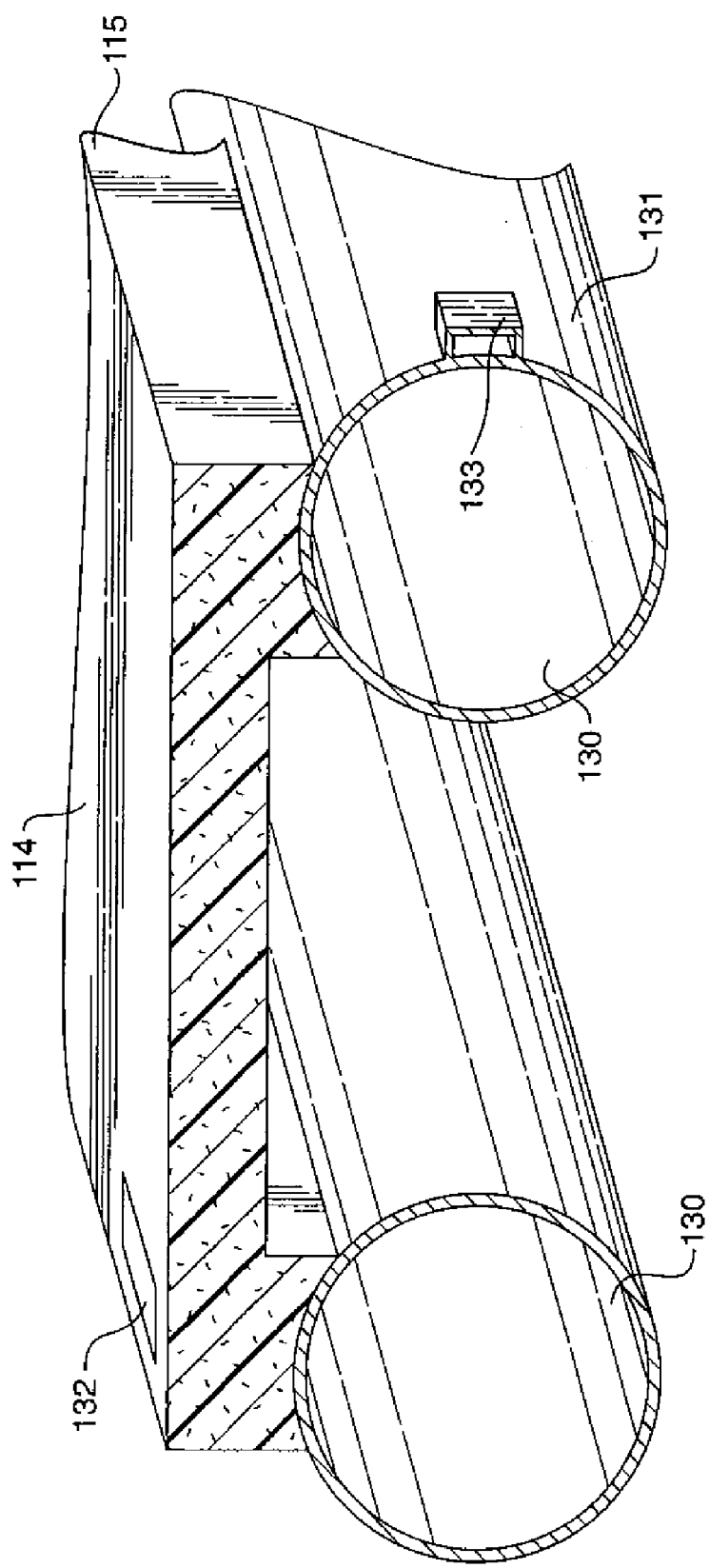

Another embodiment of the invention is shown in FIGS. 8–12 generally referred to as docking system 110. FIGS. 8–10 are partially stylized top views of an embodiment of the invention adapted to moor six sailboats, three on each side of the platform. FIGS. 11 and 12 are schematic cross sectional views of the embodiments of FIGS. 8–10 showing more detail of the walkway or platform and its two supporting buoyant frames preferably made, at least part, from aluminum.

The embodiment shown in FIG. 8 is referred to generally as docking system 110. Docking system 110 comprises a dock member including platform 112 having elongated walkway portion 114 and enlarged pickup/drop off portion 116. Platform 112 is preferably made of fiberglass but could also be made of wood or other materials from which floating docks can be made. One or more buoyant frames are coupled to the platform. The buoyant frames may have rubber strakes 133 along their outsides near the water line, to act as bumpers. The frames preferably project outward from the platform so that boats will rest against the frames rather than directly against the dock.

In some instances, tubes 130 maybe used as the frame structure. Tubes 130 may comprise inflatable tubes with heavy-duty fabric coatings of the type used in inflatable boats such as Zodiacs boats. These tubes are tough enough to withstand the rigors of a marine environment, and can be repaired if they are punctured. Alternatively, the buoyant tubes may be made of a plastic foam or another buoyant material. The tubes are coupled to the platform by any convenient means. For example, the coupling can be accomplished with non-corroding straps that encircle the tubes and are coupled to the platform in a manner that allows them to be replaced if necessary.

In the embodiment shown in FIG. 8, unique shaped tubes 122, 124, 126 and 128 in combination provide the buoyancy and the boat docking areas, as well as providing bumpers to inhibit docked boats from touching one another when docked in the manner shown in FIG. 8. Tubes 122 define v-shaped docking areas. Tubes 124 define docking areas for the boats and include a cross member tube 125 that both serve to support the outer, cantilevered tube leg as well as providing a contact point for the bow. The outer legs 127 lie between adjacent boats to act as bumpers so the boats are less likely to contact one another.

The embodiment of FIG. 8 could be made without enlarged portion 116 or tubes 126 and 128 that support portion 116. Portion 16 is provided so that the crew of the boats have a place to stand to embark or disembark from a launch, and also so that a launch for transporting the crew to and from the boats to the shore has a place to land at or along tube 128.

Since mooring 110 is able to rotate about anchor point 113, the platform will face into the wind. This provides an additional advantage in that the boat can dock into the wind.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An offshore floating docking system for mooring boats, comprising:
    a plurality of docking units comprising at least first and second docking units, each docking unit having forward and rearward ends and a longitudinal axis extending between the ends, the rearward end of the first docking unit being attached to the forward end of the second docking unit, the rearward end of the first docking unit having a width that is larger than the width of the forward end of the second docking unit, wherein opposing sides of each docking unit are angularly offset from the respective longitudinal axis to form docking stations, each docking station having docking means adapted for docking boats;
    at least one bumper attached to each docking station, said at least one bumper adapted to inhibit a docked boat from hitting adjacent docking unit;
    at least one buoyant member coupled to said plurality of docking units; and
    at least one anchoring member connected to said plurality of docking units and adapted to anchor said plurality of docking units to a substrate, wherein said at least one anchoring member comprises a means for allowing said docking units to swing for orientation along the prevailing wind and water flow directions.

2. The docking system of claim 1, wherein the docking stations each have an opening adapted to receive a bow of a boat therein.

3. The docking system of claim 2, wherein said opening is substantially triangular in shape.

4. The docking system of claim 1, wherein at least one of the docking units has a perimeter that is substantially trapezoid in shape.

5. The docking system of claim 1, wherein the anchoring member comprises a mooring ball.

6. The docking system of claim 1, further comprising at least two dock wings.

7. The docking system of claim 1, wherein the opposing sides of each docking unit are offset from the respective forward and rearward ends.

8. The docking system of claim 1, wherein the docking means comprises a means for attaching mooring lines to a bow end and a stern end of a boat.

9. The docking system of claim 1, wherein said anchoring member comprises a ball bearing to enable the docking units to orient itself in response to prevailing conditions.

* * * * *